(12) United States Patent
Nordholm et al.

(10) Patent No.: US 12,311,736 B2
(45) Date of Patent: May 27, 2025

(54) METHOD FOR THERMAL PRECONDITIONING A THERMAL BUFFER IN A VEHICLE

(71) Applicant: VOLVO TRUCK CORPORATION, Gothenburg (SE)

(72) Inventors: Linus Nordholm, Gothenburg (SE); Jerker Lennevi, Lerum (SE); Robert Karlsson, Kållekärr (SE); Devraj Dutt, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 191 days.

(21) Appl. No.: 17/866,218

(22) Filed: Jul. 15, 2022

(65) Prior Publication Data

US 2023/0021044 A1   Jan. 19, 2023

(30) Foreign Application Priority Data

Jul. 19, 2021 (EP) .................................... 21186402

(51) Int. Cl.
*B60H 1/00* (2006.01)

(52) U.S. Cl.
CPC ................ *B60H 1/00878* (2013.01)

(58) Field of Classification Search
CPC ........... B60H 1/00878; B60L 2240/545; B60L 2240/662; B60L 2260/50; B60L 58/26; B60L 58/27; B60L 1/00; Y02E 60/10
See application file for complete search history.

(56) References Cited

U.S. PATENT DOCUMENTS

| | | |
|---|---|---|
| 2015/0100188 A1 | 4/2015 | Wagner et al. |
| 2016/0059733 A1 | 3/2016 | Hettrich et al. |

(Continued)

FOREIGN PATENT DOCUMENTS

| | | |
|---|---|---|
| CN | 1457524 A | 11/2003 |
| CN | 102707257 A | 10/2012 |

(Continued)

OTHER PUBLICATIONS

Extended European Search Report in corresponding European Application No. 21186402.0 dated Dec. 23, 2021 (9 pages).

(Continued)

*Primary Examiner* — Kun Kai Ma
(74) *Attorney, Agent, or Firm* — Venable LLP; Jeffri A. Kaminski

(57) ABSTRACT

A method for thermal preconditioning at least one thermal buffer in a thermal system of a vehicle, the thermal system being a rechargeable energy storage system, RESS, and/or an energy transformation system comprising fuel cells. The method includes providing scheduled operational information of the thermal buffer, the scheduled operational information comprising a scheduled initialization time and scheduled operational load of the thermal buffer, determining whether the thermal buffer is in need of cooling or heating in order to reach a pre-determined temperature level, preconditioning the thermal buffer in accordance with the scheduled operational information such that the thermal buffer is thermally preconditioned by cooling or heating to the pre-determined level in accordance with the scheduled operational load at a time in accordance with the scheduled initialization time.

13 Claims, 3 Drawing Sheets

(56) References Cited

U.S. PATENT DOCUMENTS

| | | | |
|---|---|---|---|
| 2017/0028978 A1 | 2/2017 | Dunlap et al. | |
| 2017/0210390 A1* | 7/2017 | Porras | B60K 6/40 |
| 2019/0016230 A1 | 1/2019 | Wang et al. | |
| 2019/0157882 A1* | 5/2019 | Sherback | B60L 58/26 |
| 2022/0250506 A1* | 8/2022 | Goldman-Shenhar | G01C 21/3469 |
| 2023/0137357 A1* | 5/2023 | Chopra | B60L 3/12 320/109 |

FOREIGN PATENT DOCUMENTS

| | | |
|---|---|---|
| CN | 108717986 A | 10/2018 |
| CN | 110834566 A | 2/2020 |
| CN | 111251944 A | 6/2020 |
| DE | 102018209446 A1 | 12/2019 |
| JP | 2011111140 A | 6/2011 |
| KR | 20110088807 A | 8/2011 |
| WO | 2016083529 A1 | 6/2016 |
| WO | 2018104965 A1 | 6/2018 |

OTHER PUBLICATIONS

Extended European Search Report in corresponding European Application No. 21186392.3 dated Dec. 20, 2021 (9 pages).
European Communication pursuant to Article 94(3) dated Dec. 17, 2024 in corresponding European Patent Application No. 21186392.3, 8 pages.
Chinese Office Action dated Mar. 18, 2025 in corresponding Chinese Patent Application No. 202210814083.2, 24 pages.

\* cited by examiner

METHOD FOR THERMAL PRECONDITIONING A THERMAL BUFFER IN A VEHICLE

TECHNICAL FIELD

The present invention relates to a method for thermal preconditioning at least one thermal buffer in a thermal system of a vehicle. The invention further relates to a preconditioning system for thermal preconditioning at least one thermal buffer in a thermal system of a vehicle, to a vehicle, to a computer program and to a computer readable medium carrying a computer program.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage or energy transformation device, such as e.g. a battery or a fuel cell, is used to provide the energy needed in order to propel the vehicle. The energy storage or energy transformation devices may typically be comprised in an energy storage system or a fuel cell system of the vehicle.

During, or prior to, operation of the vehicle, there may be a need to precondition a vehicle component or system of the vehicle, such as e.g. the energy storage system or the fuel cell system. In some examples, the user of the vehicle, or a system of the vehicle, may require information regarding the need for preconditioning. Such preconditioning information is typically retrieved by requesting a preconditioning status of the particular vehicle component or system. Based on the preconditioning status, the user of the vehicle, or the system of the vehicle, may initiate preconditioning. Alternatively, the preconditioning of the vehicle component or system is performed periodically, in order to have the vehicle component or system ready for operation. Such periodically performed preconditioning may to at least some extent imply unnecessary preconditioning, as the preconditioning is performed prior to actually being needed, and/or result in a vehicle component or system not being preconditioned properly as the preconditioning is performed at another time than needed.

The preconditioning requires energy, especially preconditioning of the energy storage system or the fuel cell system, as such systems constitutes large thermal systems of the vehicle. As the available energy or power is either limited, e.g. when the vehicle is not subject to charging or fuelling, and/or is associated with a cost or an environmental impact (e.g. due to component wear), reducing the energy consumption of the vehicle is a common desire.

SUMMARY

It is an object of the present invention to at least to some extent alleviate the shortcomings discussed above in relation to preconditioning of a thermal buffer of the vehicle.

According to at least a first aspect of the present invention, a method for thermal preconditioning at least one thermal buffer of a thermal system of a vehicle, the thermal system being a rechargeable energy storage system, RESS, and/or an energy transformation system comprising fuel cells, is provided. The method comprises:

providing scheduled operational information of the thermal buffer, the scheduled operational information comprising a scheduled initialization time and scheduled operational load of the thermal buffer, determining whether the thermal buffer is in need of cooling or heating in order to reach a pre-determined temperature level, preconditioning the thermal buffer in accordance with the scheduled operational information such that the thermal buffer is thermally preconditioned by cooling or heating to the pre-determined level in accordance with the scheduled operational load at a time in accordance with the scheduled initialization time.

Hereby, energy can be saved, and/or component damage can be reduced or avoided, as the preconditioning of the thermal buffer is adapted to the scheduled operational information. Moreover, unnecessary precondemning can be reduced or avoided.

According to at least one example embodiment, the thermal buffer is a rechargeable energy storage device, e.g. a battery, or a fuel cell.

That is, said at least one thermal buffer in the thermal system is at least one rechargeable energy storage device or battery in the RESS and/or is at least one fuel cell in the energy transformation system. The energy transformation system may be referred to as a fuel cell system. The method of the invention may be applied to one or more thermal buffers of the thermal system, such as one or more rechargeable energy storage devices or batteries and/or one or more fuel cells. Thus, said at least one thermal buffer may be a plurality of thermal buffers, simply referred to as thermal buffers of the thermal system.

By preconditioning the thermal buffer in response to the scheduled operational information, by cooling or heating, an improved preconditioning of the thermal buffer is provided. In more detail, the pre-determined level of the thermal buffer is set in accordance with, or in response to, the scheduled operational load of the schedule operational information, wherein the pre-determined level is to be reached at a time in accordance with the scheduled initialization time. Stated differently, the scheduled operational information is used as input data to the preconditioning of the thermal buffer. Hereby, at least the scheduled operational load is used to vary the degree, or amount, or type, of preconditioning of the thermal buffer, and the scheduled initialization time is used to set a point in time at which the preconditioning of the thermal buffer is achieved. That is, the pre-determined level of the preconditioning is to be reached at the scheduled initialization time. The scheduled operational load may e.g. be the operational load during the initial operation of the thermal buffer, such as e.g. during the first 10 or 20 or 30 minutes of operation of the thermal buffer. Thus, the time span for the scheduled operational load may e.g. be the first 10 minutes, or the first 20 minutes, or the first 30 minutes of operation of the thermal buffer. For example, the time span is 0-10 minutes, 0-20 minutes, or 0-30 minutes. The initial operation of the thermal buffer may alternatively correspond to the thermal time constant of the thermal buffer. Thus, throughout the application text, when referring to the scheduled operation, or scheduled operational load, it is to be understood as the operation, or operation load, of the thermal buffer during such initial operation of the thermal buffer. According to at least one example embodiment, the scheduled operational load is determined as an average value during the initial operation of the thermal buffer. Moreover, by determining whether the thermal buffer is in need of cooling or heating in order to reach a pre-determined temperature level, and subsequently performing preconditioning by cooling or heating in response to determining whether cooling or heating is to be achieved to reached the pre-determined temperature level, a versatile and efficient method for thermal preconditioning the thermal buffer is provided. For example, by preconditioning the thermal buffer by means of heating, the operational performance of the thermal buffer may be improved. By preconditioning the thermal buffer by means of cooling, the thermal buffer may be prevented from being damaged due to e.g. an excessive heat exposure.

According to at least one example embodiment, heating and cooling the thermal buffer is carried out by actively heating and actively cooling the thermal buffer, respectively. Hereby, the desired preconditioning may be achieved quickly. Heating may for example be performed by a heater or a heating device, and cooling may be performed by a cooler or a cooling device. Actively heating may thus comprise providing external heat from outside of the thermal buffer. Actively cooling may thus comprise actively removing heat by heat exchanging with an external heat source of the thermal buffer. According to at least one example embodiment, preconditioning the thermal buffer in response to the scheduled operation load comprises intentionally allowing the thermal buffer to self-heat or self-cool for a predetermined time period. Hereby, an alternative to the actively heating and actively cooling of the thermal buffer is provided. Allowing the thermal buffer to self-heat or self-cool is typically requiring less energy compared to actively heating or actively cooling the thermal buffer.

According to at least one example embodiment, the scheduled operational information of the thermal buffer is set by a user or a system.

According to at least one example embodiment, the thermal system is simply referred to as a rechargeable energy storage system, RESS, comprising rechargeable energy storage devices (as e.g. batteries or supercapacitors) and/or an energy transformation system comprising fuel cells. Thus, the thermal system may be referred to as a RESS and/or a fuel cell system. Alternatively, the thermal system is referred to as an energy storage and/or transformation system. The RESS and/or the energy transformation system may be comprised of several components or sub-systems, each acting as a thermal buffer. According to at least one example embodiment, such thermal buffers within the RESS and/or the energy transformation system may be considered as a whole, and the RESS and/or the energy transformation system may simply be referred to as the thermal buffer. According to at least one example embodiment, the thermal buffer being the RESS and/or the energy transformation system, is at least one thermal buffer, such as e.g. a plurality of thermal buffers within the RESS and/or the energy transformation system.

According to at least one example embodiment, the scheduled operational information comprises the scheduled operation of the thermal buffer, such as e.g. the scheduled operational load over time, such as e.g. during a drive cycle or a work cycle of the vehicle, or at least for the scheduled initial operation of the thermal buffer as previously described.

According to at least one example embodiment, the method further comprises:
  determining the preconditioning status of the thermal buffer, the preconditioning status comprises at least a current temperature of the thermal buffer, wherein the need of cooling or heating to reach the pre-determined temperature level is based on the current temperature of the thermal buffer and the expected temperature, or expected temperature variations, of the thermal buffer related to the scheduled operational load.

Hereby, an improved preconditioning can be achieved as the current temperature of the thermal buffer and the expected temperature variations of the thermal buffer related to the scheduled operational load are taken into account to need for the preconditioning. Thus, unnecessary preconditioning can be avoided. The pre-determined temperature level may be described as being determined in response to the at least the expected temperature, or temperature variations, of the thermal buffer related to the scheduled operational load. According to at least one example embodiment, the pre-determined temperature level is the expected temperature of the thermal buffer at the scheduled initialization time. According to at least one example embodiment, the pre-determined temperature level adapted to the expected temperature variations of the thermal buffer in accordance with the scheduled operational load. Thus, by comparing the preconditioning status of the thermal buffer, at least the current temperature of the thermal buffer, with the expected temperature, or temperature variations, of the thermal buffer, it can be determined whether the thermal buffer is in need of cooling or heating in order to reach a pre-determined temperature level. Stated differently, the current temperature of the thermal buffer and the expected temperature, or expected temperature variations, of the thermal buffer related to the scheduled operational load are used as input data when determining whether the thermal buffer is in need of cooling or heating in order to reach a pre-determined temperature level.

For example, the expected temperature variations of the thermal buffer related to the scheduled operational load is determined as the expected temperature variations during the initial operation of the thermal buffer, such as e.g. during the first 10 or 20 or 30 minutes of operation of the thermal buffer.

According to at least one example embodiment, the ambient temperature of the thermal buffer is measured, and/or estimated. Such ambient temperature is typically an ambient temperature of the vehicle. According to at least one example embodiment, the expected ambient temperature at the scheduled initialization time, and/or over the previously mentioned scheduled operation of the thermal buffer, is determined or estimated. Such ambient temperature and/or expected ambient temperature may be included when determining the pre-determined temperature level, or expected temperature, or expected temperature variations, of the thermal buffer related to the scheduled operational load.

According to at least one example embodiment, the method further comprises:
  estimating power usage of the thermal buffer based on the scheduled operational load of the thermal buffer.

Thus, the preconditioning of the thermal buffer may be achieved in accordance with the estimated power usage such that the thermal buffer is thermally preconditioned by cooling or heating to the pre-determined level in accordance with the scheduled operational load at a time in accordance with the scheduled initialization time. The power usage can e.g. be used to determine the pre-determined temperature level (or the expected temperature, or the expected temperature variations, of the thermal buffer related to the scheduled operational load). For example, the power usage over the previously mentioned scheduled operation of the thermal buffer is determined. The power usage may be determined using a power level estimation functionality.

According to at least one example embodiment, the estimation of the power usage is based on a mathematical model of the scheduled operation of the vehicle, the mathematical model representing the behaviour of the thermal buffer over at least the scheduled initial operation of the thermal buffer, e.g. based on empirical data and/or estimations. The estimation of the power usage is typically based on input data, such as scheduled route, predicted road/load profile, traffic and/or weather conditions, and other internal or external parameters, e.g. parameters of the thermal buffer, parameters of the drive cycle and/or work cycle, parameters of the environment to the vehicle, as well as output data, wherein at least the output data comprises an output parameter representing the pre-determined temperature level of the thermal buffer. Thus, the estimation of the power usage may be based on a thermal model, or a heat transfer model, of the thermal buffer, and the expected temperature, or expected temperature variations, of the thermal buffer can be determined or estimated based on the thermal model. According to at least one example embodiment, the thermal model utilizes known temperature characteristics of the thermal buffer to estimate the temperature of thermal buffer. Typically, the ambient temperature and/or expected ambient temperature are input parameters to such thermal model.

According to at least one example embodiment, the scheduled operational load corresponds to the power charge and/or discharge of the scheduled operation of the thermal buffer.

Thus, according to at least one example embodiment, the power usage corresponds to the power charge and/or discharge of the scheduled operation of the thermal buffer. The power charge and discharge can e.g. be used to determine the pre-determined temperature level (or expected temperature, or expected temperature variations, of the thermal buffer related to the prediction operational load). The power discharge may be referred to as a negative operational load.

According to at least one example embodiment, the method further comprises:
in response of determining that the thermal buffer is in need of cooling to reach the pre-determined temperature level, preconditioning the thermal buffer by cooling the thermal buffer to reach the pre-determined temperature level.

Preconditioning by cooling of the thermal buffer may e.g. be carried out to protect components, such as the thermal buffer, from damage.

According to at least one example embodiment, the method further comprises:
in response of determining that the thermal buffer is in need of heating to reach the pre-determined temperature level, preconditioning the thermal buffer by heating the thermal buffer to reach the pre-determined temperature level.

Hereby, the operational performance of the thermal buffer may be improved.

According to at least one example embodiment, the scheduled operation of the thermal buffer is based on a scheduled route of the vehicle comprising scheduled auxiliary actions of performing work during at least a portion of the scheduled route.

Thus, the scheduled operation may comprise the scheduled operational load over time, i.e. over a drive cycle and/or a work cycle of the vehicle, e.g. over the initial operation of the thermal buffer as previously described. Stated differently, the scheduled route of the vehicle comprising scheduled auxiliary actions of performing work during at least a portion of the scheduled route is used as input to the scheduled operation of the thermal buffer. The auxiliary actions of performing work may e.g. be at least one of loading, carrying a load, dumping a load, digging, drilling, and lifting. The auxiliary actions of performing work may e.g. be powered by a power take off, PTO.

According to at least a second aspect of the present invention, a preconditioning system for thermal preconditioning at least one thermal buffer in a thermal system of a vehicle, the thermal system being rechargeable energy storage system, RESS, and/or an energy transformation system comprising fuel cells, is provided. The preconditioning system comprises:
a control unit configured to provide scheduled operational information of the thermal buffer, the scheduled operational information comprising a scheduled initialization time and scheduled operational load of the thermal buffer, and to determine whether the thermal buffer is in need of cooling or heating in order to reach a pre-determined temperature level,
a thermal preconditioning unit configured to precondition the thermal buffer in accordance with the scheduled operational information such that the thermal buffer is thermally preconditioned by cooling or heating to the pre-determined level in accordance with the scheduled operational load at a time in accordance with the scheduled initialization time.

Effects and features of the second aspect of the invention are largely analogous to those described above in connection with the first aspect of the invention. Embodiments mentioned in relation to the first aspect of the invention are largely compatible with the second aspect of the invention, of which some are exemplified below, typically without repetition of any technical effect.

Thus, and according to at least one example embodiment, the thermal buffer is a rechargeable energy storage device, e.g. a battery, or a fuel cell. That is, said at least one thermal buffer in the thermal system is at least one rechargeable energy storage device or battery in the RESS and/or is at least one fuel cell in the energy transformation system. The energy transformation system may be referred to as a fuel cell system. The preconditioning system of the invention may be applied to one or more thermal buffers of the thermal system, such as one or more rechargeable energy storage devices or batteries and/or one or more fuel cells.

According to at least one example embodiment, the control unit is further configured to determine the preconditioning status of the thermal buffer, the preconditioning status comprises at least a current temperature of the thermal buffer, and wherein the need of cooling or heating to reach the pre-determined temperature level is based on the current temperature of the thermal buffer and the expected temperature, or expected temperature variations, of the thermal buffer related to the scheduled operational load.

According to at least one example embodiment the control unit is further configured to determine or estimate the ambient temperature of the thermal buffer and/or the expected ambient temperature at the scheduled initialization time, and/or over the previously mentioned scheduled operation of the thermal buffer.

According to at least one example embodiment, the preconditioning system further comprises:
a power usage estimation unit configured to estimate power usage of the thermal buffer based on the scheduled operational load of the thermal buffer.

Thus, the power usage estimation unit may be configured to estimate power usage of the thermal buffer as described with reference to the first aspect of the invention, e.g. by using a thermal model, or heat transfer model, of the thermal buffer. The power usage estimation unit may according to at least one example embodiment be comprised in the control unit, and hence, constitute corresponding functions of the control unit. The power usage may comprise the power charge and/or discharge of the scheduled operation of the thermal buffer.

According to at least one example embodiment, the control unit is further configured to instruct the thermal preconditioning unit to cool the thermal buffer towards the pre-determined temperature level in response of determining that the thermal buffer is in need of cooling to reach the pre-determined temperature level.

That is, the thermal preconditioning unit comprises at least the functionality to cool the thermal buffer, e.g. by comprising a cooler.

According to at least one example embodiment, the control unit is further configured to instruct the thermal preconditioning unit to heat the thermal buffer towards the pre-determined temperature level in response of determining that the thermal buffer is in need of heating to reach the pre-determined temperature level.

That is, the thermal preconditioning unit comprises at least the functionality to heat the thermal buffer, e.g. by comprising a heater.

According to a third aspect of the invention, a vehicle comprising the preconditioning system according to the second aspect of the invention is provided.

Effects and features of the third aspect of the invention are largely analogous to those described above in connection with the first and second aspects of the invention. Embodiments mentioned in relation to the first and second aspects of the invention are largely compatible with the third aspect of the invention, of which some are exemplified below.

According to at least one example embodiment, the vehicle comprises a power take off, PTO, and an auxiliary action equipment configured to achieve auxiliary actions of performing work, such as e.g. at least one of loading, carrying a load, dumping a load, digging, drilling, and lifting According to at least one example embodiment, the vehicle further comprises the thermal system being a rechargeable energy storage system, RESS, comprising batteries or supercapacitors, and/or being an energy transformation system comprising fuel cells. Thus, the vehicle may be an electric vehicle, or a hybrid vehicle.

According to a fourth aspect of the invention, a computer program comprising program code means for performing the method according to the first aspect of the invention, when the program is run on a computer, is provided.

According to a fifth aspect of the invention, a computer readable medium carrying a computer program comprising program code means for performing the method according to the first aspect of the invention, when the program is run on a computer, is provided.

Effects and features of the fourth and fifths aspects of the invention are largely analogous to those described above in connection with the first aspect of the invention. Embodiments mentioned in relation to the first aspect of the invention are largely compatible with the fourth and fifth aspects of the invention.

The order of the method steps described in the present disclosure is not constrained to that described in the first aspect of the invention. One or several of the steps could switch places, or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
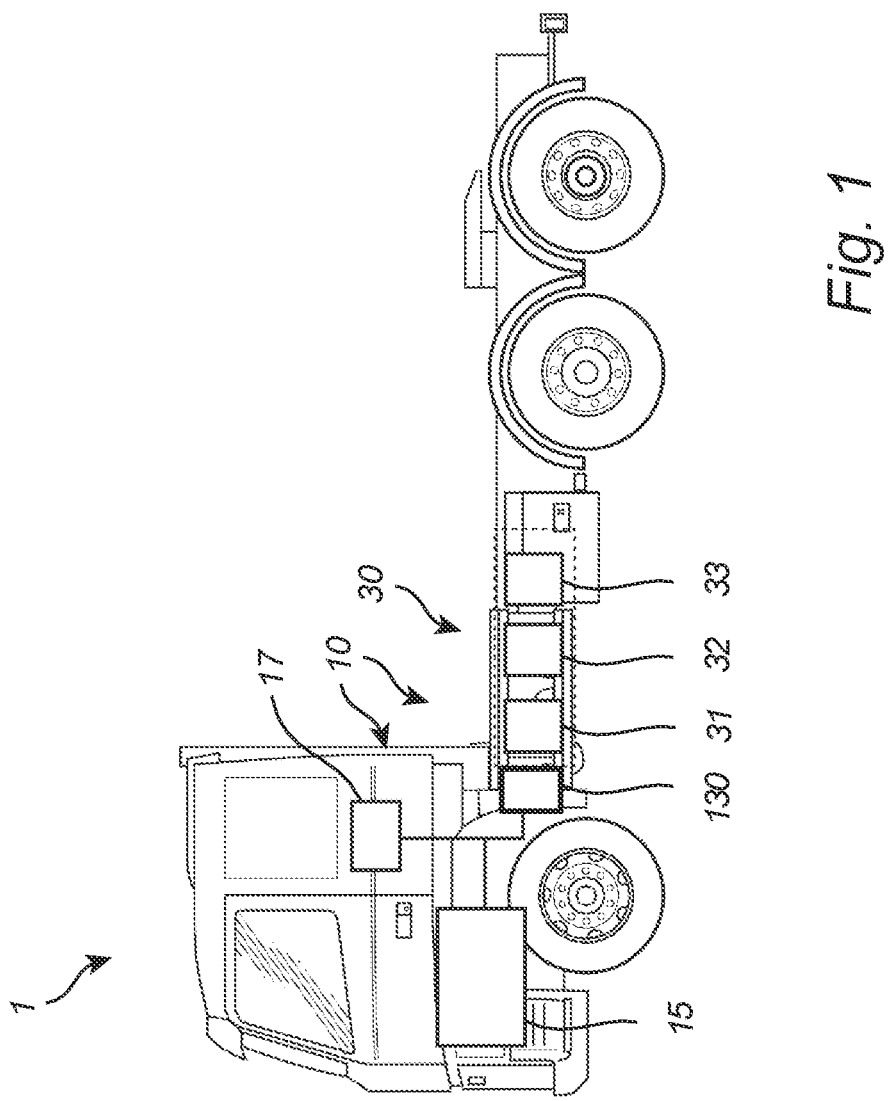
FIG. 1 is a schematic side view of a vehicle comprising a preconditioning system for thermal preconditioning a thermal buffer in a vehicle, in accordance with example embodiments of the invention.

With reference to FIG. 1, a vehicle 1, here embodied as a heavy duty truck 1, is disclosed for which a method and a preconditioning system 10 for thermal preconditioning at least one thermal buffer 31, 32, 33 of a thermal system 30 of a kind disclosed in the present invention is advantageous. However, the method and the preconditioning system 10 may as well be implemented in other types of vehicles, such as in busses, light-weight trucks, passenger cars, marine applications (e.g. in a vessel) etc. The vehicle 1 is an electric vehicle, such as a full electric vehicle or a hybrid, comprising at least one electric machine 15. In FIG. 1, the thermal system 30 is a rechargeable energy storage system, RESS, such as e.g. a battery system, or is a fuel cell system, which is configured to power the electric machine 15. In the example of FIG. 1, the thermal system 30 comprises three energy storage or transformation devices 31, 32, 33, such as e.g. battery packs 31, 32, 33, being thermal buffers 31, 32, 33 of the thermal system 30. The preconditioning system 10 may comprise a control unit 17 and a thermal preconditioning unit 130, the control unit 17 being configured to control thermal preconditioning of at least one of the thermal buffers 31, 32, 33 by means of the thermal preconditioning unit 130, and possibly configured to control the operation of the thermal system 30. The vehicle 1 typically further comprises other parts of the powertrain such as transmission, drive shafts and wheels (not shown in detail).

Figure 2:
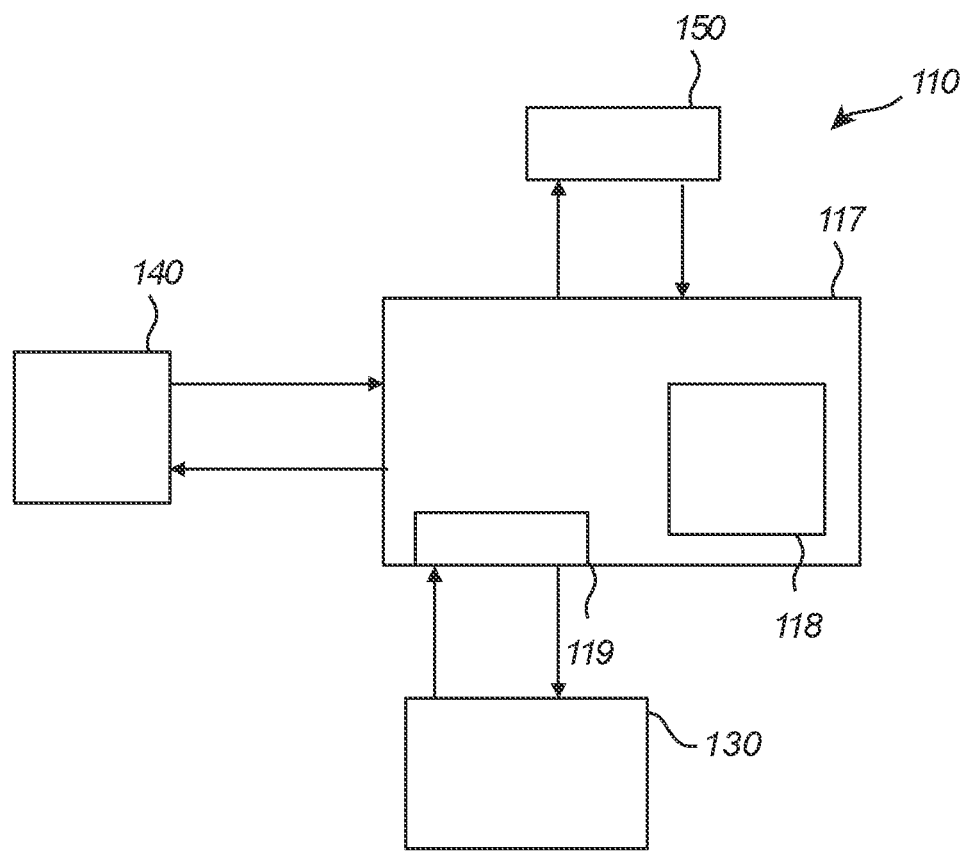
FIG. 2 is a schematic view of a preconditioning system for thermal preconditioning a thermal buffer comprising at least a control unit and a thermal preconditioning unit, in accordance with an example embodiment of the invention.

FIG. 2 is a schematic view of a preconditioning system 110 comprising a control unit 117 and various vehicle components and systems interacting with the control unit 117. The embodiment shown in FIG. 2 may be implemented in the vehicle 1 of FIG. 1. The preconditioning system 110 comprises a thermal preconditioning unit 130 configured to precondition a thermal buffer (such as one or more of the thermal buffers 31, 32, 33 of FIG. 1), and a request unit 140 configured to directly or indirectly request for a preconditioning of the thermal buffer via the control unit 117 and the thermal preconditioning unit 130. In the embodiment of FIG. 2, a parameter providing unit 150 configured to provide parameter data, such as e.g. external parameter data, is also comprised in the preconditioning system 110, and a power usage estimation unit 118 is comprised in the control unit 117. Moreover, in FIG. 2, the power usage estimation unit 118 is forming an integral part of the control unit 117, but it may as well be arranged as a separate unit relative to the control unit 117. Thus, the control unit 117 is configured to interact with the thermal preconditioning unit 130, the request unit 140, the parameter providing unit 150 and the power usage estimation unit 118.

The control unit 117 is configured to provide scheduled operational information of the thermal buffer, e.g. by receiving such information by the request unit 140. Thus, the request unit 140 may according to one example embodiment supply scheduled operational information of the thermal buffer, the scheduled operational information comprising a scheduled initialization time and scheduled operational load of the thermal buffer, as will be described in more detail later. Moreover, the control unit 117 is configured to determine whether the thermal buffer is in need of cooling or heating in order to reach a pre-determined temperature level. The pre-determined level may e.g. be determined by utilizing the power usage estimation unit 118 which is configured to estimate power usage of the thermal buffer based on the scheduled operational load of the thermal buffer. The power usage may be used to determine the expected temperature, or expected temperature variations, of the thermal buffer related to the scheduled operational load. The power usage estimation unit 118 may comprise, or be configured to implement, a thermal model, or heat transfer model, of the thermal buffer, and the temperature of the thermal buffer can be determined or estimated based on the thermal model together with the scheduled operational load. The thermal model may typically utilize known temperature characteristics of the thermal buffer to estimate the temperature of thermal buffer. That is, the control unit 117, or power usage estimation unit 118, typically comprises a computer program comprising program code means for at least executing the thermal model, and possibly storing the thermal model. The ambient temperature may as well be used in determining the expected temperature, or expected temperature variations of the thermal buffer, and e.g. be used as input data to the thermal model. For example, the parameter providing unit 150 may e.g. be a sensor, such as a temperature sensor, configured to measure the ambient temperature of the thermal buffer and/or vehicle. Additionally, or alternatively, a preconditioning status of the thermal buffer may be determined by the control unit 117, the preconditioning status comprises at least a current temperature of the thermal buffer. For example, the need of cooling or heating in order to reach the pre-determined temperature level may be based on the preconditioning status of the thermal buffer, or current temperature of the thermal buffer, and the expected temperature, or expected temperature variations, of the thermal buffer related to the scheduled operational load.

Subsequently, the control unit 117 instructs the thermal preconditioning unit 130 to precondition the thermal buffer in accordance with the scheduled operational information, e.g. the power usage, such that the thermal buffer is thermally preconditioned by cooling or heating to the pre-determined level in accordance with the scheduled operational load at a time in accordance with the scheduled initialization time.

The request unit 140 may e.g. be integrated into a vehicle functionality of automatically or periodically requesting preconditioning of the thermal buffer, and/or may be a user-input device configured to enable a manual functionality of requesting preconditioning of the thermal buffer. The latter may e.g. be a vehicle display or a user device, such as e.g. a mobile phone or tablet. The request unit 140 can for example be a mobile app, in vehicle cluster or an offboard vehicle management system. However, it should be noted that the request unit 140, the parameter providing unit 150, and the power usage estimation unit 118 are optional. Thus, the scheduled operational information of the thermal buffer may be provided from something else than the request unit 140, and the thermal preconditioning may be operable without the input from the parameter providing unit 150 and the power usage estimation unit 118.

With reference to FIG. 2, the following example procedure may be carried out when thermally preconditioning the thermal buffer.

A user (not shown) uses the request unit 140 to set the usage need of the vehicle. For example, the usage need includes information to when the vehicle is to be used, corresponding to a scheduled initialization time, and for what the vehicle is to be used for, corresponding to a schedule operational load. For example, the user may set a planned or scheduled route, and/or desired destination, possibly together with scheduled auxiliary actions of performing work during at least a portion of the scheduled route. As an example, such usage need may be that the vehicle is to be utilized for performance driving at 08:00 tomorrow and/or utilizing PTO (i.e. for auxiliary actions of performing work) at 13:00. Depending on the level of details of the usage need, it may be used as input data to determine the scheduled operational information of the thermal buffer, and/or it may be used directly to determine the scheduled operational information of the thermal buffer. For example, the usage need may be pre-processed, e.g. by including topography of the scheduled route, predicted road, traffic and/or weather conditions, and other internal or external parameters e.g. parameters of the thermal buffer, parameters of the drive cycle and/or work cycle, parameters of the environment to the vehicle, to determine the scheduled operational information of the thermal buffer. Such pre-processing may be performed by the control unit 117, and/or when determining the power usage by the power usage estimation unit 118 as described below.

Thus, the control unit 117 receives and/or provides the scheduled operational information of the thermal buffer, wherein the scheduled operational information comprises at least the scheduled initialization time and the scheduled operational load. Subsequently, the scheduled operational information may be sent as input to the power usage estimation unit 118 to estimate power usage of the thermal buffer based on the scheduled operational load. Typically, the power usage comprises power charge and/or discharge corresponding to the scheduled operational information of the thermal buffer. The power usage from the power usage estimation unit 118 may subsequently be used as input to a preconditioning schedular 119 which utilizes the scheduled initialization time and the power usage of the scheduled operational information to schedule the operation of the thermal preconditioning unit 130. Hereby, the thermal preconditioning unit 130 can be operated based on the scheduled preconditioning and precondition the thermal buffer in accordance with the scheduled operational information. Hereby, the thermal buffer is thermally preconditioned by cooling or heating to the pre-determined level in accordance with the scheduled operational load, or power usage, at a time in accordance with the scheduled initialization time, as previously described. Thus, the system will be ready with the preconditioning to a sufficient level that enables the thermal buffer to be able to deliver a specific charge and discharge power.

Alternatively, the preconditioning scheduler 119 queries the thermal preconditioning unit 130 when it can be ready with the preconditioning to a sufficient level that enables the thermal buffer to be able to deliver a specific charge and discharge power. The thermal preconditioning unit 130 may then respond to the preconditioning scheduler 119 with a time duration information until the specific request can be fulfilled. The time duration information received by the preconditioning scheduler 119 is then used to determine at what time it needs to request the start of preconditioning by means of the thermal preconditioning unit 130. In addition, the preconditioning scheduler 119 may recalibrates this start of preconditioning time by re-initiating and taking into account for changes in ambient temperature. Such information may be sent back to the user via the request unit 140. It is also possible for the user, via the request unit 140, to request an estimation of time needed to precondition the thermal buffer as previously described, without actually initiating a preconditioning request. Hereby, the user can be given the information how much time he/she would be able to use the vehicle without actually initiating a preconditioning request.

Figure 3:
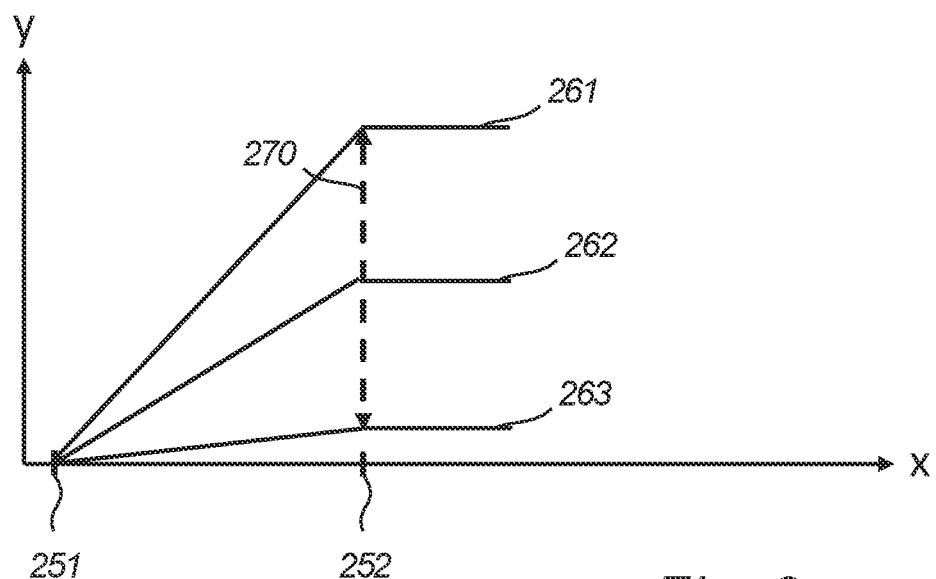
FIG. 3 is a graph showing the precondition of a thermal buffer for various different scheduled operational information of the thermal buffer.

An example result of preconditioning the thermal buffer in accordance with the scheduled operational information is presented in FIG. 3. FIG. 3 is a graph showing the temperature (y-axis) as a function of time (x-axis), in which the start time 251 of the preconditioning using thermal preconditioning unit 130 is shown prior to the scheduled initialization time 252. Three cases, represented by lines 261, 262, 263 corresponds to different preconditioning scenarios of the thermal buffer performed in response to different scheduled operational information, but where the scheduled initialization time 252 is the same. The first line 261 corresponds to a first preconditioning scenario in which the scheduled operational load is relatively high. That is, the power usage, or the power discharge of the thermal buffer, is scheduled to be high for the initial operation of the thermal buffer. Thus, preconditioning of the thermal buffer is performed to a relatively high pre-determined level corresponding to a relatively high preconditioned temperature of the thermal buffer. The third line 263 corresponds to a third preconditioning scenario in which the scheduled operational load is relatively low. That is, the power usage, or the power discharge of the thermal buffer, is scheduled to be low for the initial operation of the thermal buffer. Thus, preconditioning of the thermal buffer is performed to a relatively low pre-determined level corresponding to a relatively low preconditioned temperature of the thermal buffer. Thus, less energy will be used for preconditioning the thermal buffer in accordance with the third preconditioning scenario as compared to the first preconditioning scenario. Moreover, the second line 262 corresponds to a second preconditioning scenario in which the scheduled operational load is between the relatively high and relatively low of the first and third preconditioning scenarios. That is, the power usage, or the power discharge of the thermal buffer, is scheduled to be moderate for the initial operation of the thermal buffer. Thus, preconditioning of the thermal buffer is performed to a moderate pre-determined level corresponding to a moderate preconditioned temperature of the thermal buffer. Thus, less energy will be used for preconditioning the thermal buffer in accordance with the second preconditioning scenario as compared to the first preconditioning scenario, but more as compared to the third preconditioning scenario. Hereby, the thermal buffer is thermally preconditioned to different degrees, i.e. to different pre-determined levels, in accordance with the scheduled operational load at a time in accordance with the scheduled initialization time, as represented by the double arrow 270. Subsequent to, or after, the scheduled initialization time 252, no preconditioning is occurring.

It should be understood that the example of FIG. 3 is a simplified representation of the preconditioning of the thermal buffer for three preconditioning scenarios under the same conditions. As been described before, different ambient temperatures typically affect the preconditioning, and may even require cooling of the thermal buffer.

Figure 4:
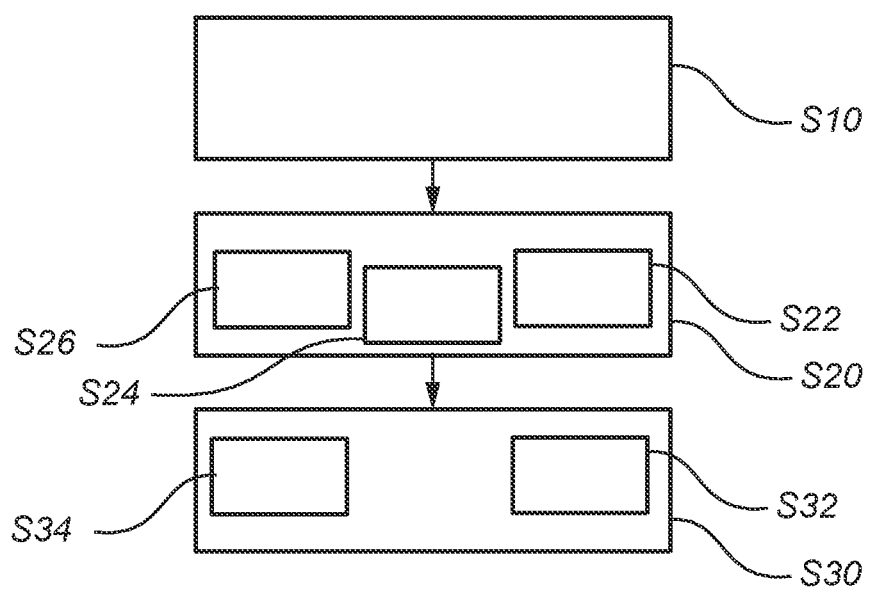
FIG. 4 is a flowchart illustrating the steps of a method in accordance with example embodiments of the invention.

A method for thermal preconditioning at least one thermal buffer in a thermal system of a vehicle, the thermal system being a rechargeable energy storage system, RESS, and/or an energy transformation system comprising fuel cells, will now be described in more general terms with additional reference to FIG. 4. FIG. 4 is a flowchart describing the steps of such method. The method may e.g. be implemented in the control unit 117 of FIG. 2, and used in the vehicle 1 of FIG. 1. Thus, the thermal buffer is typically a rechargeable energy storage device, such as a battery or a supercapacitor, of the RESS and/or is a fuel cell of the energy transformation system.

In a first step S10, scheduled operational information of the thermal buffer is provided, the scheduled operational information comprising a scheduled initialization time and scheduled operational load of the thermal buffer. Such scheduled operational information is typically related to a usage need given by a user or by a system comprising scheduled information of the vehicle. The scheduled operation of the thermal buffer may comprise a scheduled route of the vehicle comprising scheduled auxiliary actions of performing work during at least a portion of the scheduled route.

In a second step S20, it is determined whether the thermal buffer is in need of cooling or heating in order to reach a pre-determined temperature level.

In a third step S30, the thermal buffer is preconditioned in accordance with the scheduled operational information such that the thermal buffer is thermally preconditioned by cooling or heating to the pre-determined level in accordance with the scheduled operational load at a time in accordance with the scheduled initialization time.

In a first optional sub-step S22 to the second step S20, the method comprises: determining the preconditioning status of the thermal buffer. The preconditioning status comprises at least a current temperature of the thermal buffer. The preconditioning status may be used as input data together with the expected temperature, or expected temperature variations, of the thermal buffer related to the scheduled operational load to determine the need of cooling or heating to reach the pre-determined temperature level to which the thermal buffer is to be preconditioned. Thus, both the current temperature of the thermal buffer and the expected temperature, or expected temperature variations of the thermal buffer related to the scheduled operational load may be used to determine whether the thermal buffer is in need of cooling or heating. Thus, the method may comprise an optional second sub-step S24 to the second step S20, of determining the need of cooling or heating in response to the preconditioning status of the thermal buffer and the expected temperature, or expected temperature variations of the thermal buffer related to the scheduled operational load. As described previously, the ambient temperature of the vehicle may be used as input data to the expected temperature, or expected temperature variations of the thermal buffer.

In a third optional sub-step S26 to the second step S20, the method comprises: estimating power usage of the thermal buffer based on the scheduled operational load of the thermal buffer. The power usage may e.g. be used to determine the expected temperature, or expected temperature variations of the thermal buffer related to the scheduled operational load (typically together with the determined ambient temperature, or expected ambient temperature, during such time). The power usage may thus be used in the step S30 of preconditioning the thermal buffer, as the thermal buffer may be preconditioned in accordance with the power usage of the scheduled operational information such that the thermal buffer is thermally preconditioned by cooling or heating to the pre-determined level in accordance with the power usage of the scheduled operational load at a time in accordance with the scheduled initialization time. The power usage may correspond to the power charge and/or discharge of the scheduled operation of the thermal buffer.

In a first optional sub-step S32 to the third step S30, the method comprises: in response of determining that the thermal buffer is in need of cooling to reach the pre-determined temperature level, preconditioning the thermal buffer by cooling the thermal buffer to reach the pre-determined temperature level. By preconditioning the thermal buffer by means of cooling, the thermal buffer may be prevented from being damaged due to e.g. an excessive heat exposure.

In a second optional sub-step S34 to the third step S30, the method comprises: in response of determining that the thermal buffer is in need of heating to reach the pre-determined temperature level, preconditioning the thermal buffer by heating the thermal buffer to reach the pre-determined temperature level. By preconditioning the thermal buffer by means of heating, the operational performance of the thermal buffer may be improved.

It should be understood that the first optional sub-step S32 may be performed prior to, or subsequent to, or alternatively to, the second optional sub-step S34.

It should be noted that the naming of the steps not necessarily, but might according to at least one example embodiment, relate to the order in which the steps are carried out, unless explicitly stated otherwise. One or more of the steps may be combined and carried out simultaneously. The control unit 117 of FIG. 2 may be configured to carry out one or several of the steps S10-S34.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for thermal preconditioning at least one thermal buffer of a thermal system of a vehicle, the thermal system being a rechargeable energy storage system, RESS, and/or an energy transformation system comprising fuel cells, the at least one thermal buffer being a rechargeable energy storage device or a fuel cell, the method comprising:
providing scheduled operational information of the at least one thermal buffer, the scheduled operational information comprising a scheduled initialization time and scheduled operational load of the at least one thermal buffer,
determining whether the at least one thermal buffer is in need of cooling or heating in order to reach a pre-determined temperature level,
preconditioning the at least one thermal buffer in accordance with the scheduled operational information such that the at least one thermal buffer is thermally preconditioned by cooling or heating to the pre-determined level in accordance with the scheduled operational load at a time in accordance with the scheduled initialization time, wherein the scheduled initialization time of the at least one thermal buffer is a set point in time at which the preconditioning of the at least one thermal buffer is achieved such that the pre-determined level of the preconditioning is reached at the scheduled initialization time.

2. The method according to claim 1, the method further comprising:
determining the preconditioning status of the at least one thermal buffer, the preconditioning status comprises at least a current temperature of the at least one thermal buffer, wherein the need of cooling or heating to reach the pre-determined temperature level is based on the current temperature of the at least one thermal buffer and the expected temperature, or temperature variations, of the at least one thermal buffer related to the scheduled operational load.

3. The method according to claim 1, further comprising:
estimating power usage of the at least one thermal buffer based on the scheduled operational load of the at least one thermal buffer.

4. The method according to claim 1, wherein the scheduled operational load corresponds to the power charge and/or discharge of the scheduled operation of the at least one thermal buffer.

5. The method according to claim 1, further comprising:
in response of determining that the at least one thermal buffer is in need of cooling to reach the pre-determined temperature level, preconditioning the at least one thermal buffer by cooling the thermal buffer to reach the pre-determined temperature level.

6. The method according to claim 1, wherein the scheduled operation of the at least one thermal buffer is based on a scheduled route of the vehicle comprising scheduled auxiliary actions of performing work during at least a portion of the scheduled route.

7. The method according to claim 1, wherein the rechargeable energy storage device is a battery.

8. A non-transitory computer readable medium carrying a computer program comprising program code for performing the method according to claim 1, when the computer program is run on a computer.

9. A preconditioning system for thermal preconditioning at least one thermal buffer in a thermal system of a vehicle, the thermal system being rechargeable energy storage system, RESS, and/or an energy transformation system comprising fuel cells, the at least one thermal buffer being a rechargeable energy storage device or a fuel cell, the preconditioning system comprising:
a control unit configured to provide scheduled operational information of the at least one thermal buffer, the scheduled operational information comprising a scheduled initialization time and scheduled operational load of the at least one thermal buffer, and to determine whether the at least one thermal buffer is in need of cooling or heating in order to reach a pre-determined temperature level, a thermal preconditioning unit configured to precondition the at least one thermal buffer in accordance with the scheduled operational information such that the at least one thermal buffer is thermally preconditioned by cooling or heating to the pre-determined level in accordance with the scheduled operational load at a time in accordance with the scheduled initialization time, wherein the scheduled initialization time of the at least one thermal buffer is a set point in time at which the preconditioning of the at least one thermal buffer is achieved such that the pre-determined level of the preconditioning is reached at the scheduled initialization time.

10. The preconditioning system according to claim 9, wherein the control unit is further configured to determine the preconditioning status of the at least one thermal buffer, the preconditioning status comprises at least a current temperature of the at least one thermal buffer, and wherein the pre-determined temperature level is based on the current temperature of the at least one thermal buffer and the expected temperature variations of the at least one thermal buffer related to the scheduled operational load.

11. The preconditioning system according to claim 9, further comprising:

a power usage estimation unit configured to estimate power usage of the at least one thermal buffer based on the scheduled operational load of the at least one thermal buffer.

12. The preconditioning system according to claim 9, wherein the control unit is further configured to instruct the thermal preconditioning unit to cool the at least one thermal buffer towards the pre-determined temperature level in response of determining that the at least one thermal buffer is in need of cooling to reach the pre-determined temperature level.

13. A vehicle comprising the preconditioning system according to claim 9.

* * * * *